Patented Apr. 12, 1932

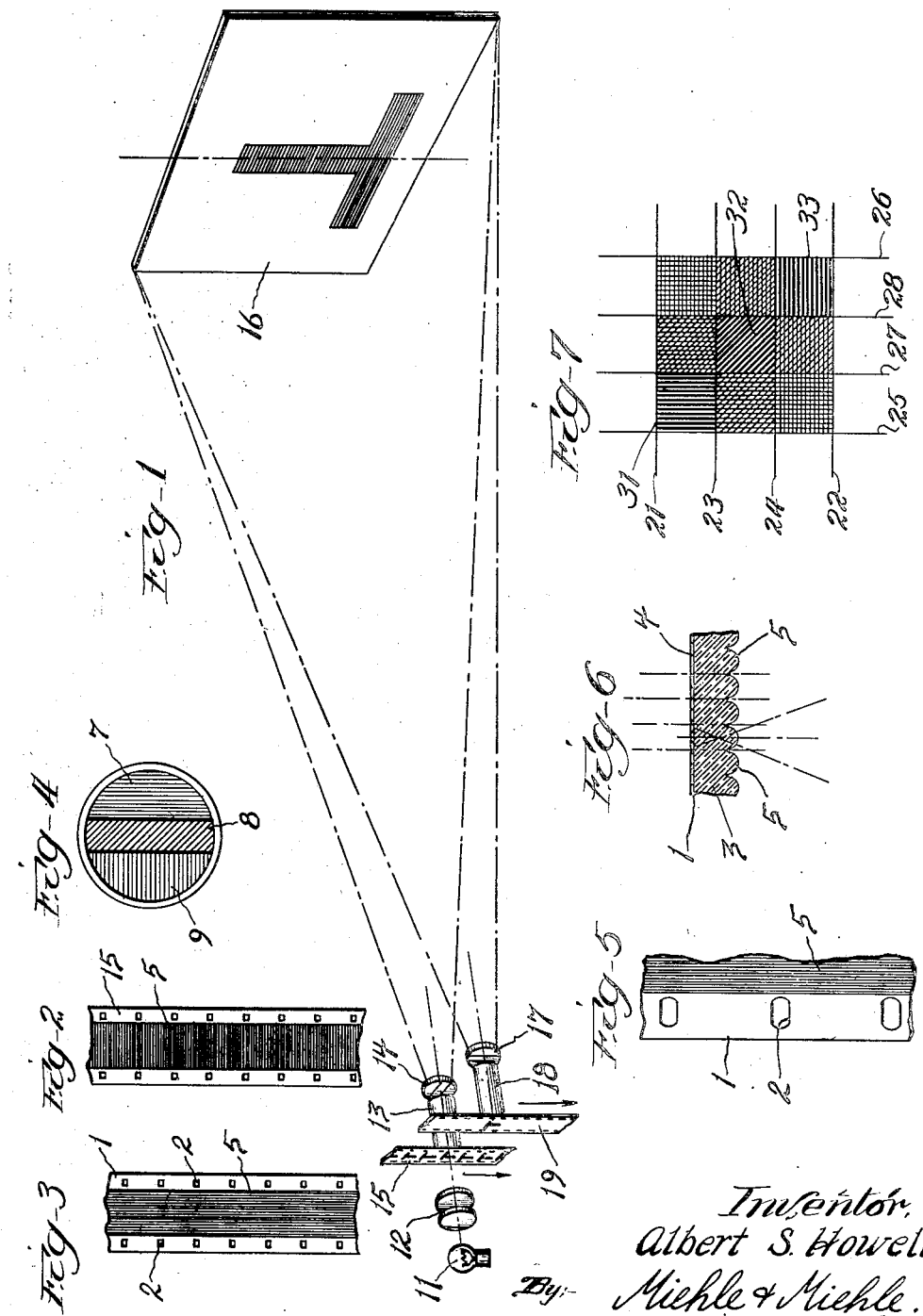

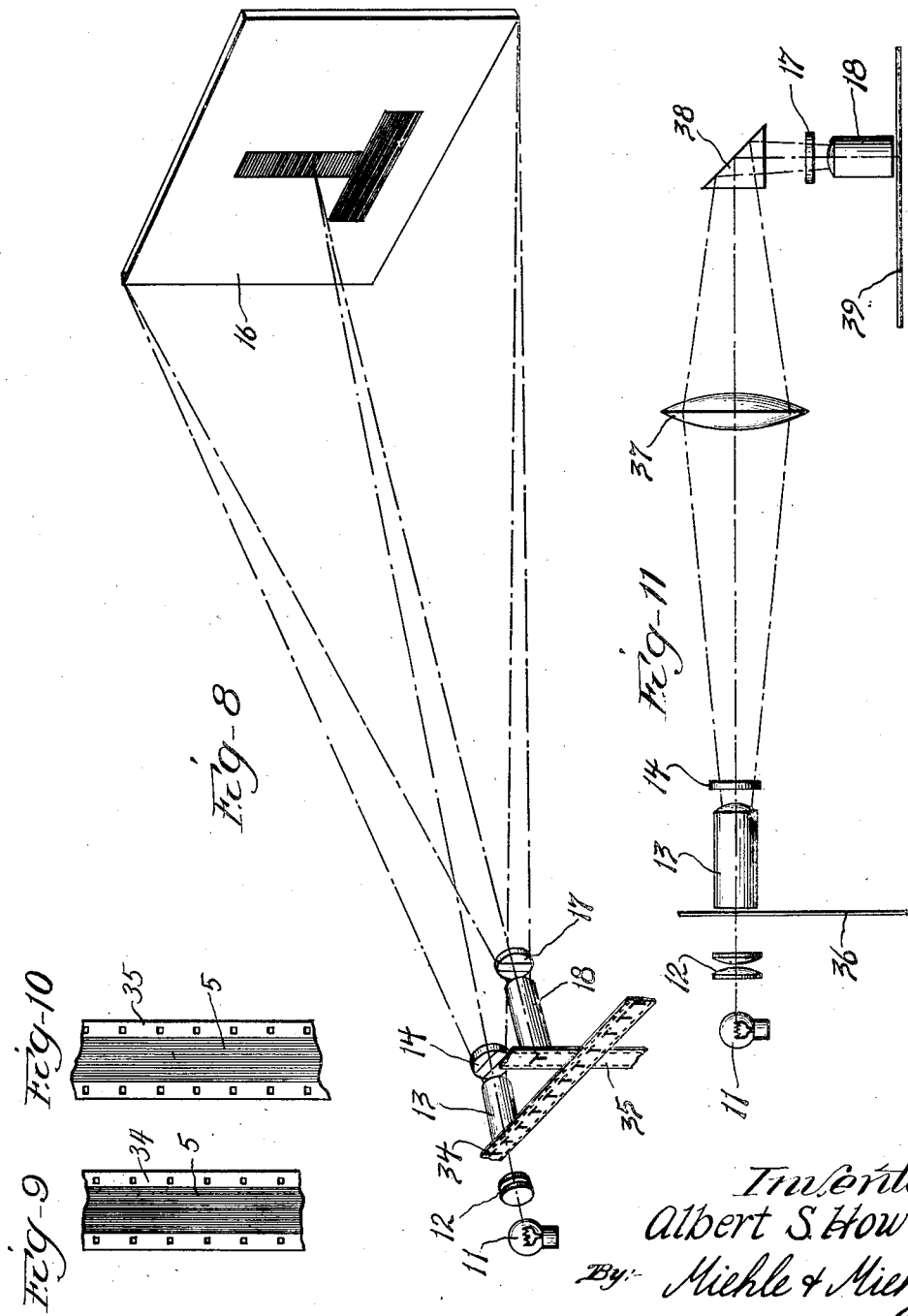

1,853,683

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

PRINTING FOR COLOR PHOTOGRAPHY

Application filed November 16, 1929. Serial No. 407,637.

My invention relates particularly to color photography of the type disclosed in U. S. Patent No. 992,151, granted May 16, 1911, to R. Berthon, and has particular relation to the printing from photographic plates or films such as are described therein upon similar plates or films for the projection or reproduction of colored pictures therefrom, particularly with reference to the projection or production of colored motion pictures.

The apparatus described in the above designated patent involves a photographic plate or film provided with a photographic layer and a plurality of minute refracting lens elements used in conjunction with a tri-chromatic band filter, which results in recording on the photographic layer the varying color values of the subject photographed on the plate or film in a great number of minute tri-part sections, each part of each section receiving and carrying the color value of the corresponding portion of the subject photographed with reference to a respective band of the filter.

Obviously, the printing from such a photographic plate or film bearing an image upon a similar photographic plate or film for the reproduction of the image in colors therefrom presents difficulties not encountered in the printing of ordinary "black and white" photographic plates or films, and it is the object of my invention to provide a comparatively simple and practical method for printing photographic films or plates of the type disclosed in said patent from image bearing films or plates of the same type for the reproduction of the image printed thereon in color, particularly with a view toward the printing of motion picture film of said type for the projection or production of colored motion pictures therefrom.

My invention will be better understood by reference to the accompanying drawings in which:—

Figure 1 is a diagrammatic perspective of one manner of practicing my invention;

Figures 2 and 3 are face views respectively of the printing or image bearing photographic film and the sensitized photographic film printed therefrom in the manner shown in Figure 1 and Figure 11 hereinafter described;

Figure 4 is one of the tri-chromatic band filters used in the practice of my invention;

Figure 5 is an enlarged partial face view of the film shown in Figure 2;

Figure 6 is an enlarged and exaggerated partial transverse section of the film shown in Figure 5;

Figure 7 is a theoretic illustration of the printing action involved in the practice of my invention;

Figure 8 is a diagrammatic perspective of another manner of practicing my invention;

Figures 9 and 10 are face views respectively of the printing or image bearing photographic film and the sensitized photographic film printed therefrom in the manner illustrated in Figure 8; and Figure 11 is a diagrammatic view of another manner of practicing my invention.

Like characters of reference indicate like parts in the several views.

The photographic plate or film of the type disclosed in the said patent and now used commercially is illustrated in Figures 3, 5 and 6 and designated generally at 1, it being in the form of a motion picture film strip provided with longitudinally spaced marginal perforations 2. The portion of the film intermediate the perforations is the picture portion thereof and is constructed as follows:

This picture portion of the film consists of a transparent base or support 3, a photographic layer 4 on one face thereof, and a series of minute refracting lens elements 5 formed on the opposite face of the base. See Figure 6. This form of film seems to be the most practical and, as commercially used, has the lens elements 5 in parallel linear form and extending longitudinally of the film, as illustrated in Figures 3, 5 and 6.

Images are photographed on and projected from the plate or film of the characteristics described in said patent or as above described in conjunction with a poly-chromatic band color filter and a suitable objective. As illustrated at 6, see Figure 4, this band filter is tri-chromatic and consists of a red filter band 7, a green filter band 8, and a blue filter band 9, said bands being of shades and densities related in a manner unnecessary to be described.

Where the lens elements 5 of the plate or film are in parallel linear form, the bands of the filter 6 are disposed in parallelism therewith, and cooperating therewith effect the recording on the photographic layer 4 of the plate or film the varying color values of the subject photographed in a number of minute tri-part sections, corresponding with the lens elements 5, each part of each section receiving and carrying the color value of the corresponding subject photographed with reference to respective filter bands 7, 8 and 9. and 9.

In projecting an image from the image bearing plate or film the same or a corresponding filter, similarly disposed with reference to the lens elements 5, and a suitable objective is used whereby the action is reversed and the image is projected in color.

As a result the projected image of the plate or film is composed of a series of sections corresponding with the lens elements 5, each section receiving light through the different bands of the filter in accordance with the color of the corresponding section of the image photographed.

The method of my invention whereby the type of film above described is printed will now be described.

Referring to Figure 1, a projecting device comprising a source of printing light 11, a condensing lens 12, an objective lens 13, and a tri-chromatic band filter 14, is used to project from an image bearing film 15 of the above described type.

The image from the film 15 is projected by this projecting device upon a partial reflecting or projection screen 16, from which it is reflected through a corresponding trichromatic band filter 17 and an objective lens 18 of a photographic camera device upon a sensitized film 19 of the above described type.

In carrying out the method of my invention as illustrated in Figure 1, the bands of the projection filter 14 are disposed transversely of the printing film 15, and this film, having the lens elements 5 thereof of the preferred parallel linear form, has these lens elements disposed transversely thereof and consequently parallel with the bands of this filter 14, see Figures 1 and 2, it being understood that the image on this film has previously been impressed thereon through a corresponding similarly disposed band filter.

As a result the image of the film 15 is projected upon the screen 16 with the projected sections thereof, hereinbefore described, in lineal form and disposed horizontally corresponding with the projection filter 14 and lens elements 5 of the film 15.

The bands of the filter 17 of the camera device are disposed vertically, and accordingly at 90° to the bands of the projection filter 14. Accordingly, the lens elements 5 of the sensitized film 19 in the camera device are disposed in parallelism with the bands of the camera filter 17 and are disposed longitudinally of the film.

The exposure of the film 19 during the printing operation is effected in an otherwise usual manner, and where, as shown, the film is motion picture film a suitable step by step and shutter mechanism, not shown, is used to effect the printing operation progressively along the films.

As a result of the method of my invention, the aforementioned linear sections of the projected image are impressed upon the sensitized film 19 at an angle of 90° to the bands of the camera filter 17 and the lens elements 5 of the film 19.

Consequently, the recording of the color values of the image upon the sensitized film 19 in minute tri-part sections, as hereinbefore described, is not interfered with by the projection of the image in sections corresponding with the lens elements 5 of the printing film 15, so that a projection from the film 19 after finishing by a reversal process and in conjunction with a corresponding band filter results in a projected image in color substantially the same as one projected from the printing film 15 through a corresponding band filter. Obviously, if the film 15 is of negative characteristics, the film 19 is printed positively, in which case it is finished as a positive film without reversal.

Figure 7 illustrates theoretically the action which takes place in the practice of my method.

In this figure the horizontal lines 21 and 22 designate one of the tri-part sections of the printing film 15 which is divided by the intermediate lines 23 and 24 into three longitudinal parts, each of which carries the value of the color of a corresponding band of the filter used therewith with reference to the corresponding section of the subject photographed, the section 21—23 carrying the red, the section 23—24 carrying the green, and the section 24—22 carrying the blue.

The vertical lines 25 and 26 designate one of the tri-part sections on the printed film 19 which is divided by the intermediate lines 27 and 28 into three longitudinal parts, each of which receives and carries the value of the color of a corresponding band of the filter used therewith with reference to that portion of the section 21—22 which it traverses, the section 25—27 carrying the red, the section 27—28 carrying the green, and the section 28—26 carrying the blue.

The squares of Figure 7 at which the corresponding color bands or parts of the tripart sections cross designate the color values transferred to the sensitized film 19 from the printing film 15. Thus the square 31 designates the red color value, the square 32 designates the green color value, and the square 33 designates the blue color value, the remainder of these squares being modified or neutralized in the printing from the film 15 upon the film 19 by the optical angular relation of the two band filters used in the printing.

Figure 8 illustrates a manner of practicing by invention in which both a printing or image bearing film 34 and a sensitized film 35 have the linear lens elements 5 thereof extending longitudinally of the film. Figure 9 illustrates the printing or image bearing film 34 and Figure 10 illustrates the sensitized film 35.

In practicing the invention as illustrated in Figure 8 the films are disposed at right angles to each other for the purpose of effecting the necessary angular relation of the linear lens elements 5 of the films and the band filters.

Otherwise, the same apparatus is used in the practice of the invention as illustrated in Figure 8 as is used in the practice of the invention as illustrated in Figure 1. Accordingly, the same reference characters are applied to like parts.

Figure 11 illustrates another manner of practicing my invention. This differs from the illustrations of Figures 1 and 8 in that the image is projected from a printing film 36 in a projecting device and band filter through a focusing lens 37 and then reflected from a reflecting prism 38 to a camera device in which is a sensitized film 39.

Otherwise, the same apparatus is used in the practice of my invention as illustrated in Figure 11 as is used in Figures 1 and 8. Accordingly, the same reference characters are applied to like parts.

In the practice of my invention as illustrated in Figure 11 the films are of the type shown in Figures 2 and 3, though films having the linear lens elements of both films extending longitudinally thereof may be in the manner illustrated in Figure 8.

It will be observed that, in all of the manners of practicing my invention illustrated, a reflecting member is optically interposed between the two band filters used in the printing operation. This results in the positioning of the image on the sensitized film in a relation similar to that which the image has on the printing film, and resulting, in the case of motion pictures, in the proper action rather than a reversed action.

I find that the angular optical relation of the two band filters used during the printing operation may be varied from approximately 45° to 90°, the results improving as the angular relation increases and the best results being obtained when this angular relation is at 90°.

While I have herein shown and particularly described the preferred embodiment of my invention I do not wish to be limited to the precise details of construction shown as changes may readily be made without departing from the spirit of my invention, but having thus described my invention, I claim as new and desire to secure by Letters Patent the following:

1. In the art of color photography involving photographic elements provided with minute refracting lens elements and used in conjunction with poly-chromatic band filters, the method of printing consisting of projecting from a photographic printing element upon a sensitized photographic element with a poly-chromatic band filter coordinated with the sensitized element disposed optically at a relatively large angle to a second corresponding poly-chromatic band filter coordinated with the printing element.

2. In the art of color photography involving photographic elements provided with minute refracting lens elements and used in conjunction with poly-chromatic band filters, the method of printing consisting of projecting from a photographic printing element upon a sensitized photographic element with a poly-chromatic band filter coordinated with the sensitized element disposed optically at a relatively large angle to a second corresponding poly-chromatic band filter coordinated with the printing element and with a reflecting element optically interposed between said filters.

3. In the art of color photography involving photographic elements provided with minute parallel linear refracting lens elements and used in conjunction with tri-chromatic band filters, the method of printing consisting of projecting from a photographic printing element upon a sensitized photographic element with the lens elements of the sensitized element and a tri-chromatic band filter coordinated therewith disposed optically at a relatively large angle to the lens elements of the printing element and a second corresponding tri-chromatic band filter coordinated with the printing element.

4. In the art of color photography involving photographic elements provided with minute parallel linear refracting lens elements and used in conjunction with tri-chromatic band filters, the method of printing consisting of projecting from a photographic printing element upon a sensitized photographic element with the lens elements of the sensitized element and a tri-chromatic band filter coordinated therewith disposed optically at an angle of approximately 90° to the lens elements of the printing element and a second corresponding tri-chromatic band filter coordinated with the printing element and with a reflecting element optically interposed between said filters.

In witness whereof I hereunto affix my signature this 9th day of November, 1929.

ALBERT S. HOWELL.